(No Model.)

J. G. ARAM.
WAGON BRAKE LEVER.

No. 282,432.  Patented July 31, 1883.

Witnesses:
Phil C. Dietrich
Arthur E. Dowell

Inventor:
Jonathan G. Aram
by
Manahan & Ward
Attys.

UNITED STATES PATENT OFFICE.

JONATHAN G. ARAM, OF MOLINE, ILLINOIS, ASSIGNOR OF ONE-HALF TO ROBERT ELLIS, OF SAME PLACE.

WAGON-BRAKE LEVER.

SPECIFICATION forming part of Letters Patent No. 282,432, dated July 31, 1883.

Application filed May 21, 1883. (No model.)

*To all whom it may concern:*

Be it known that I, JONATHAN G. ARAM, a citizen of the United States, residing at Moline, in the county of Rock Island and State of Illinois, have invented certain new and useful Improvements in Wagon-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention refers to brakes on ordinary road-wagons designed to draw the rubbers or locks against the periphery of the carrying-wheels, and pertains alone to improvements in the hand-lever, certain parts co-operating therewith, and the attachment of the draw-rod to such lever.

Figure 1:
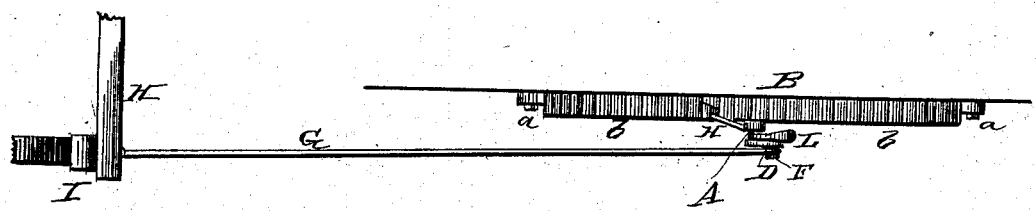
Figure 2:
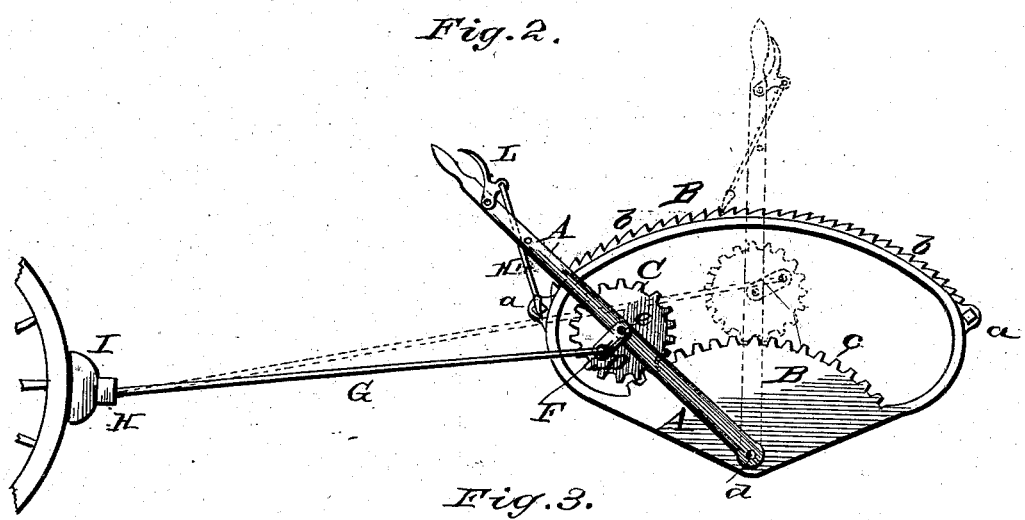
Figure 3:
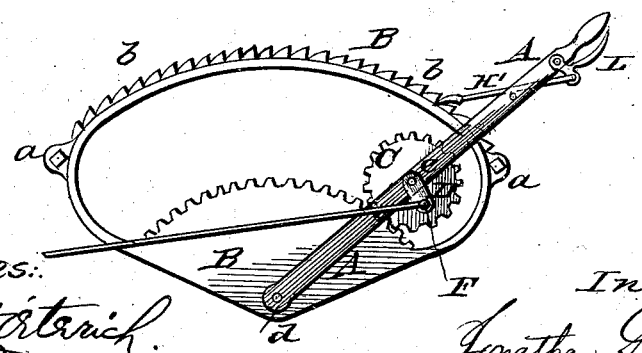

In the drawings, Figure 1 is a plan view of a brake embodying my invention. Fig. 2 is a side elevation of the parts constituting my invention, with the lever A at the rear limit of its action. Fig. 3 is the same, with the lever A at the forward limit of its action.

B is an arched iron loop bolted against the side of the wagon, at any suitable locality, by means of the bolts *a a*. The upper side of the loop B is furnished with the series of ratchets, *b b b*, and on the upper or inner surface of its lower side is also formed the series of corrugations or cogs, *c c c*.

A is a vertical hand-lever, placed within convenient reach of the operator and fulcrumed at its lower end to the loop B at *d*. On the inside of the lever A, at such point as to traverse the interior part of the loop B, is axled the pinion C integral with its axle, and having on its periphery cogs fitted to engage the series of cogs *c* of the loop B as the lever A is moved forward and back. On the exterior of the lever A, and rigidly affixed to the axle *e* of the pinion C, is the crank D, provided with the wrist-pin F, to which crank-wrist is pivotally attached the draw-rod G, which actuates the horizontal lever H, which in turn forces the rubbers I against the outside of the carrying-wheels of the vehicle.

In order that the operator may have sufficient leverage to draw the rubbers tightly against the carrying wheels, it is essential that the point of attachment of the draw-rod G be near the fulcrum *d* of the lever A. This condition makes it necessary that the upper end of the lever A shall move quite a distance in order to draw the rod G proportionately a very short distance. In practice, therefore, heretofore the operator, who usually is seated, has had to reach an inconvenient distance both backward and forward in order to pass the lever A sufficiently far for the purpose aforesaid. An additional disadvantage has been that the lever A is usually at arm's length forward and downward at the precise moment when the rubbers are brought against the faces of the carrying-wheels, and the greatest exertion of strength on the part of the operator is demanded. A certain amount of movement of the rubbers cannot be dispensed with, because when not in use they must be withdrawn from the faces of the wheels sufficiently to prevent the accumulation of the mud thereon, which is more or less carried around by the wheels, and which, if suffered to lodge upon the rubbers, is likely to wedge in between such rubbers and the wheels, creating friction and increasing the labor of the team. Inasmuch as the movement of the rubbers, until they impinge upon the faces of the wheels, requires no more power than is requisite to merely move the parts, I have devised mechanism by which the power of the lever A shall vary in different parts of the arc of its movement, culminating near the front extremity thereof, at which point the pressure of the rubbers against the wheels is required. To do this I change the point of attachment of the draw-rod G to the lever A relatively to the fulcrumed end of the latter as such lever is progressed, and this is one of the controlling ideas of my invention.

It will be observed that when the lever A is at the extreme rear end of its action, as shown in Fig. 2, the wrist-pin F is removed from the fulcrum *d* of the lever A the length of the crank D beyond the axle *e* of the pinion C. As the lever A is moved forward, the cogs *c c* of the loop B engage those of the pinion C, and rotate such pinion forward. The axle *e*, being integral with the pinion C, revolves with the latter and carries the crank D and wrist-pin F forward also, throwing such wrist-pin, and, therefore, the forward end of the draw-rod G, forward of the lever A. During part of the movement of the lever A the operator is merely taking up what might be termed the "slack" of the rubbers I. By the time the rubbers I have struck the faces of the carrying-wheels, the wrist-pin F has described about one-third of a revolution. Thenceforward, the wrist-pin F falls below the plane of the axle $e$ and approaches a line drawn between such axle and the fulcrum $d$, and has the action of a knee-lever on the draw-rod G. Therefore, at the point or time when the greatest power is required to force the rubbers against the carrying-wheels, the wrist-pin F (being the point of attachment of the draw-rod G) is not only near the fulcrum $d$—a position to give the greatest power to the lever A—but by the pivotal action of the axle $e$ in conjunction with the forward pressure upon the lever A, there is exerted upon the draw-rod G, through the medium of the wrist-pin F, the additional power of a knee-lever. Thus great power in the lever A is attained at the precise moment when needed without fixing the point of attachment of the draw-rod G close to the fulcrum $d$ and thereby necessitating a longer sweep of the upper end of the lever A.

A second equally important feature of my invention is that the engagement of the lower surface of the pinion C in the cogs $c\ c$ creates a movable fulcrum for the lever A, and, as the wrist-pin F approaches very nearly to the latter fulcrum at the point of greatest resistance of the rubbers, there is again the double advantage of propinquity of the weight and fulcrum supplemented by the action of the knee-lever. Yet, by reason of this latter fulcrum having been changed forward in the line of the arc, the draw-rod G has been carried farther forward than if the latter fulcrum had been a fixed point, and the slack of the rubbers has been taken up before the greatest exertion of power was requisite.

H' is an ordinary pawl, attached to the short end of the bell-crank lever L, which latter is pivoted at its angle against the lever A, in such relation that when the pawl H' is in one of the ratchets, $b$, the long end of the lever L hangs slightly out of line with the lever A; but the operator, in grasping the lever A, can include in his grasp the long end of the lever L, and thus withdraw the pawl H' from the ratchet $b$. The purpose of the ratchets $b$ and pawl H' is to enable the operator to fix or hold the lever A in any part of its movement. The increased power of the lever A, as here shown, may be applied to other uses.

What I claim as my invention, and desire to secure by Letters Patent of the United States, is—

1. The combination of the lever A, loop B, provided with the cogs $c\ c$, the pinion C, the axle $e$, crank D, and draw-rod G, the crank D and axle $e$ being integral with such pinion, substantially as shown and for the purpose described.

2. In a wagon-brake, the loop B, provided with the segmental series of cogs $c\ c$, and adapted for attachment to the wagon, the pinion C, rigidly affixed to the axle $e$, the axle $e$, journaled on the lever A, the crank D, integral with such axle $e$, the draw-rod G, pivotally attached to such crank D by means of the wrist-pin F, and the lever A, in combination substantially as shown, whereby the wrist-pin F has a larger movement than the axle $e$, and approaches the fulcrumed end of the lever A during the latter part of the action of such lever, substantially as and for the purpose specified.

In testimony whereof I affix my signature in presence of two witnesses.

JONATHAN GRUNDY ARAM.

Witnesses:
 WM. H. EDWARDS,
 H. W. HYDE.